United States Patent
Kimura et al.

(10) Patent No.: US 10,144,282 B2
(45) Date of Patent: Dec. 4, 2018

(54) SHIFT POSITION SWITCHING DEVICE

(71) Applicant: DENSO CORPORATION, Kariya, Aichi-pref. (JP)

(72) Inventors: Kiyoshi Kimura, Kariya (JP); Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 347 days.

(21) Appl. No.: 14/789,157

(22) Filed: Jul. 1, 2015

(65) Prior Publication Data

US 2016/0003349 A1    Jan. 7, 2016

(30) Foreign Application Priority Data

Jul. 2, 2014    (JP) .................................. 2014-137203

(51) Int. Cl.
| | | |
|---|---|---|
| *F16H 61/32* | (2006.01) | |
| *B60K 23/02* | (2006.01) | |
| *F16H 59/10* | (2006.01) | |
| *F16H 61/00* | (2006.01) | |

(52) U.S. Cl.
CPC .......... *B60K 23/02* (2013.01); *F16H 59/105* (2013.01); *F16H 61/32* (2013.01); *B60K 2702/02* (2013.01); *B60Y 2300/70* (2013.01); *F16H 2061/0087* (2013.01); *F16H 2061/326* (2013.01)

(58) Field of Classification Search
CPC ............... F16H 61/32; F16H 2061/326; F16H 2061/0087; F16H 63/3416; F16H 63/3466; F16H 59/105
See application file for complete search history.

(56) References Cited

U.S. PATENT DOCUMENTS

| | | | |
|---|---|---|---|
| 2004/0066165 A1 | 4/2004 | Kamio et al. | |
| 2005/0104549 A1* | 5/2005 | Nishimura | ............. B25J 9/1651 318/568.24 |
| 2006/0207373 A1 | 9/2006 | Amamiya et al. | |
| 2009/0120222 A1 | 5/2009 | Kimura et al. | |

FOREIGN PATENT DOCUMENTS

| | | |
|---|---|---|
| JP | 2004-308848 | 11/2004 |
| JP | 2010-33513 | 2/2010 |

* cited by examiner

*Primary Examiner* — Edwin A Young
(74) *Attorney, Agent, or Firm* — Nixon & Vanderhye P.C.

(57) ABSTRACT

A shift position switching device for shifting gears in association with a shift position. The device includes a shift mechanism switching between shift positions using a drive power of a motor, an encoder outputting pulse signals in sync with a rotation of the motor, and a controller rotating the motor to a target rotation position corresponding to an intended gear. The controller rotates the motor toward a dead-end on a first shift position side of the shift mechanism while observing a motor rotation speed or an acceleration of rotation of the motor based on the outputted pulse signals of the encoder. Also, the controller learns, as a reference position on the first shift position side, a first rotation position of the motor.

8 Claims, 10 Drawing Sheets

| PREVIOUS TRIP | | | WALL POSITION LEARN CONTROL | |
|---|---|---|---|---|
| SHIFT RANGE | ROTATABLE AMOUNT | ECU INST | P WALL | NON-P WALL |
| P RANGE | DETECTED | | PERFORMED | N. A. |
| | UNKNOWN | | PERFORMED | PERFORMED |
| NON-P RANGE | DETECTED | | N. A. | PERFORMED |
| | UNKNOWN | | PERFORMED | PERFORMED |
| UNKNOWN | | P RANGE | PERFORMED | PERFORMED |
| | | NON-P RANGE | PERFORMED | PERFORMED |

FIG. 7

| P WALL POS | NON-P WALL POS | ROTATABLE AMOUNT | TARGET ROTATION POS CALCULATION | |
|---|---|---|---|---|
| | | | P TARGET ROTATION POS | NON-P TARGET ROTATION POS |
| LEARNED | LEARNED | DETECTED | P WALL POS + MARGIN | NON-P WALL POS − MARGIN |
| LEARNED | UNKNOWN | DETECTED | P WALL POS + MARGIN | P WALL POS + ACTUAL ROTATABLE AMOUNT − MARGIN |
| LEARNED | UNKNOWN | UNKNOWN | P WALL POS + MARGIN | P WALL POS + BY-DESIGN ROTATABLE AMOUNT |
| UNKNOWN | LEARNED | DETECTED | NON-P WALL POS − ACTUAL ROTATABLE AMOUNT + MARGIN | NON-P WALL POS − MARGIN |
| UNKNOWN | LEARNED | UNKNOWN | NON-P WALL POS − BY-DESIGN ROTATABLE AMOUNT | NON-P WALL POS − MARGIN |

SHIFT POSITION SWITCHING DEVICE

CROSS REFERENCE TO RELATED APPLICATION

The present application is based on and claims the benefit of priority of Japanese Patent Application No. 2014-137203, filed on Jul. 2, 2014, the disclosure of which is incorporated herein by reference.

TECHNICAL FIELD

The present disclosure generally relates to a shift position switching controller for switching between shift positions by using a motor as its power source.

BACKGROUND INFORMATION

Mechanical drive systems in vehicles are gradually replaced with electrical drive—by-wire—systems, for space efficiency, assemblability, controllability and the like, where the mechanism of the drive system is driven by motors. An example of such a replacement is found in the field of mechanical transmission, for example, in a shift position switching mechanism driven by a motor. In such a system, the drive control of the motor is performed based on an encoder count, or counting the number of pulse signals from the encoder installed in the motor. The motor is then rotated to a position that corresponds to the target shift position (i.e., to the target encoder count), to switch the shift positions.

In such a system, a reference position of the rotation drive of the motor is learned based on a method disclosed in Japanese patent No. 4248290, for example. The method disclosed in such a document rotates the motor toward one dead-end (i.e., P wall) on a P position side of the position switching mechanism, and the reference position of the P position side is learned based on a constant encoder count, i.e., when the encoder count stays at a maximum value, or at a minimum value for a certain period of time.

However, the method in the above-mentioned patent document 1 forces the motor to rotate for a certain period of time at the dead-end rotation position, thereby forcing the motor and the switching mechanism to warp and twist when learning the reference position, which may be undesirable in terms of the product life and durability of the motor. In addition, the learning time for learning such a reference position is long, and the power consumption of the motor will not be saved for such period.

SUMMARY

It is an object of the present disclosure to improve a shift position switching device/mechanism for the longer product life and durability, while cutting down a reference position learning time and an electric power consumption at a time of its operation.

In an aspect of the present disclosure, a shift position switching device for shifting gears in association with a shift position is disclosed. The device Includes a shift mechanism switching between shift positions using a drive power of a motor, an encoder outputting pulse signals in sync with a rotation of the motor, and a controller rotating the motor to a target rotation position corresponding to an intended gear. The controller rotates the motor toward a dead-end on a first shift position side of the shift mechanism while observing a motor rotation speed or an acceleration of rotation of the motor based on the outputted pulse signals of the encoder.

Also, the controller learns, as a reference position on the first shift position side, a first rotation position of the motor at which a fall of the motor rotation speed or a fall of the acceleration of rotation of the motor down to or below a threshold value is observed.

When the shift mechanism is rotated by the motor to the dead-end position, a play of a rotation and transmission system is exhausted, and the motor and the shift mechanism start to be warped and twisted, for example, which means that the rotation speed of the motor steeply falls. In view of such a behavior, the present disclosure rotates the motor toward the dead-end position, and, when a fall of the rotation speed or the rotation acceleration of the motor down to or below a threshold value is observed, it is determined that the motor rotation comes to a dead-end on a first shift position side, and such a rotation position is learned as the reference position of the motor, on the first shift position side.

In such manner, the shift mechanism is appropriately controlled based on the reference position of the motor on the first shift position side, where the position is learned as described above. Further, there is no need to forcefully rotate the motor until its components are warped. Thus, the durability-conscious and time-saving motor rotation control is achieved.

BRIEF DESCRIPTION OF THE DRAWINGS

Objects, features, and advantages of the present disclosure will become more apparent from the following detailed description made with reference to the accompanying drawings, in which:

FIG. 7 shows an exemplary method of calculating a target rotation position of the motor;

DETAILED DESCRIPTION

Figure 1:
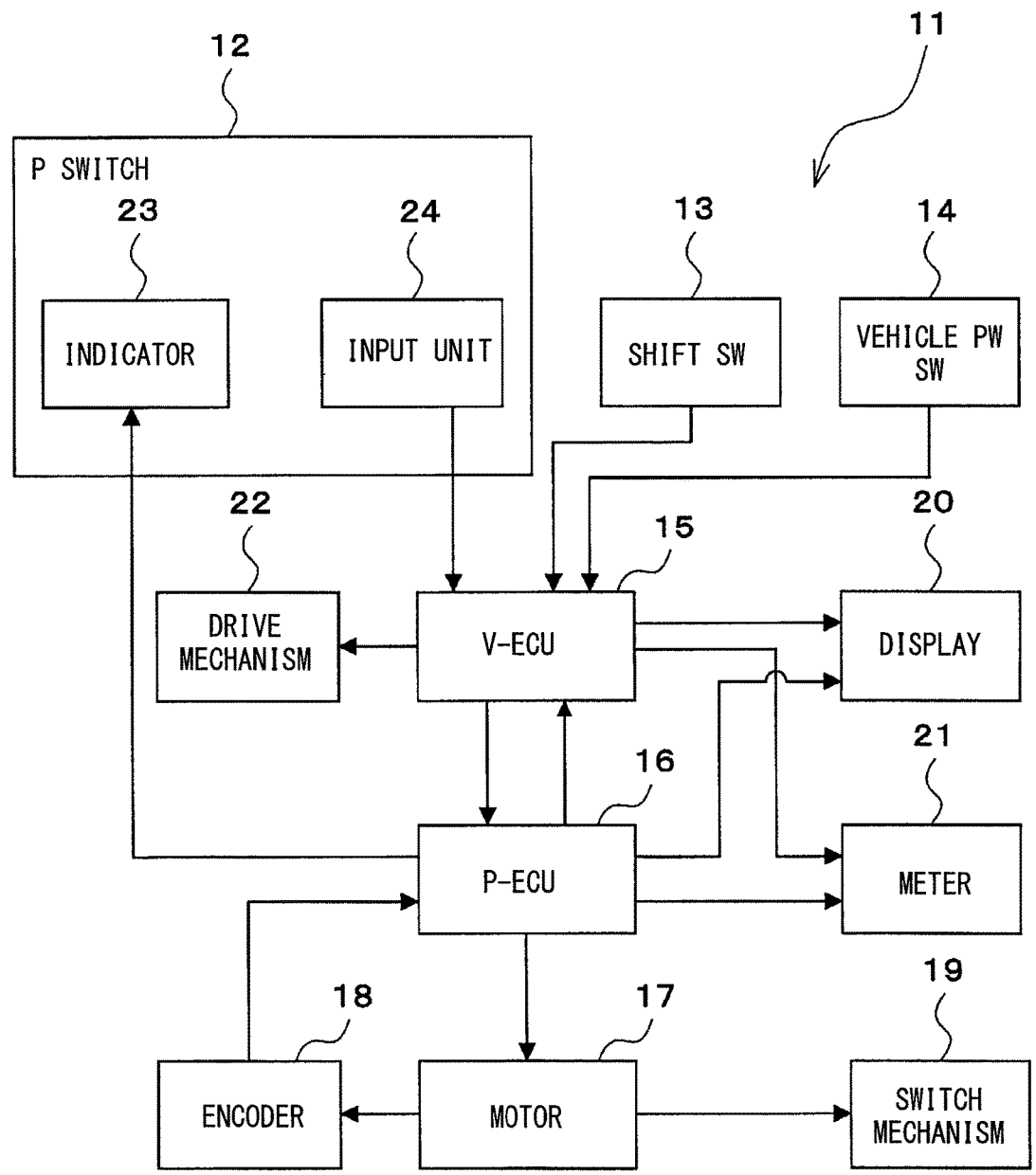
FIG. 1 shows a configuration of a shift control system according to one embodiment of the present disclosure.

Embodiments of the present disclosure are hereinafter described in connection with the drawings. In the following description, like components are denoted by like reference characters, and the like components are named identically and function identically. Thus, a detailed description thereof will not be repeated. Further, it is noted that the terms "shift range" and "shift position" are herein used interchangeably.

FIG. 1 shows a configuration of a shift control system 11 according to one embodiment of the present disclosure. The shift control system 11 of the present embodiment is used for switching the shift range of a vehicle. The shift control system 11 includes a P switch 12, a shift switch 13, a vehicle power switch 14, a vehicle control unit (hereinafter referred to as "V-ECU") 15, a parking control unit (hereinafter "P-ECU") 16, a motor 17, an encoder 18, a shift mechanism 19, a display unit 20, a meter 21, and a drive mechanism 22 together with other parts. The shift control system 11 functions as a shift-by-wire system which switches the shift range under electrical control. Specifically, the shift mechanism 19 is driven by the motor 17 to switch the shift range.

The vehicle power switch 14 is a switch for turning on and turning off the electric power supply of the vehicle. The vehicle power switch 14 is not limited to a particular one, and may, for example, be an ignition switch. An instruction from a user, a driver for example, that is received by the vehicle power switch 14 is transmitted to the V-ECU 15. For example, in response to turning-on of the vehicle power switch 14, electric power is supplied from an auxiliary battery (not shown) to operate the shift control system 11.

The P switch 12 is used to change the shift range between the parking range (hereinafter "P range") and any range except for the parking range (hereinafter "non-P range") and includes an indicator 23 for showing a state of the switch to the driver as well as an input unit 24 for receiving an instruction from the driver. The driver inputs through the input unit 24 an instruction to switch the shift range to the P range. The input unit 24 may be a momentary switch. The instruction received by the input unit 24 is transmitted to the V-ECU 15 and to the P-ECU 16 through the V-ECU 15.

The P-ECU 16 controls operation of the motor 17 that drives the shift mechanism 19 in order to change the shift range between the P range and the non-P range, and shows a current state of the shift range on the indicator 23. If the driver presses the input unit 24 when the shift range is the non-P range, the P-ECU 16 switches the shift range to the P range and shows that the current shift range is the P range on the indicator 23.

The motor 17 is constructed of a switched reluctance motor (hereinafter "SR motor") and drives the shift mechanism 19 in response to an instruction from the P-ECU 16. The encoder 18 rotates together with the motor 17 to detect a rotational state of the SR motor. The encoder 18 of the present embodiment is a rotary encoder which outputs A-phase, B-phase and Z-phase signals at every preset angle in synchronization of the rotation of the motor 17.

The P-ECU 16 receives signals that are output from the encoder 18 to know a rotational state of the motor 17 based on the count of such output signals, i.e., encoder counts, and thereby control power supply, i.e., power supply phases, for driving the motor 17. Further, the P-ECU 16 drives the motor 17 to a rotation position (i.e., to a target count) that corresponds to a target range, for the switching of the shift range to the target range.

The shift switch 13 is a switch used for switching the shift range to the drive range (D), the reverse range (R), the neutral range (N) and the brake range (B), for example, or canceling the P range when the P range is already selected. An instruction from the driver that is received by the shift switch 13 is transmitted to the V-ECU 15. Based on the instruction from the driver, the V-ECU 15 controls the drive mechanism 22 to change the shift range and shows the current state of the shift range on the meter 21. Although the drive mechanism 22 here is constructed of a continuously-variable transmission mechanism, the drive mechanism may be constructed of an automatic gearbox transmission mechanism (i.e., of a stepwise gear change mechanism).

The V-ECU 15 entirely controls operation of the shift control system 11. The display unit 20 indicates instructions and warnings, for example, to the driver that are issued by the V-ECU 15 or the P-ECU 16. The meter 21 indicates a state of equipment of the vehicle and a state of the shift range etcetera.

Figure 2:
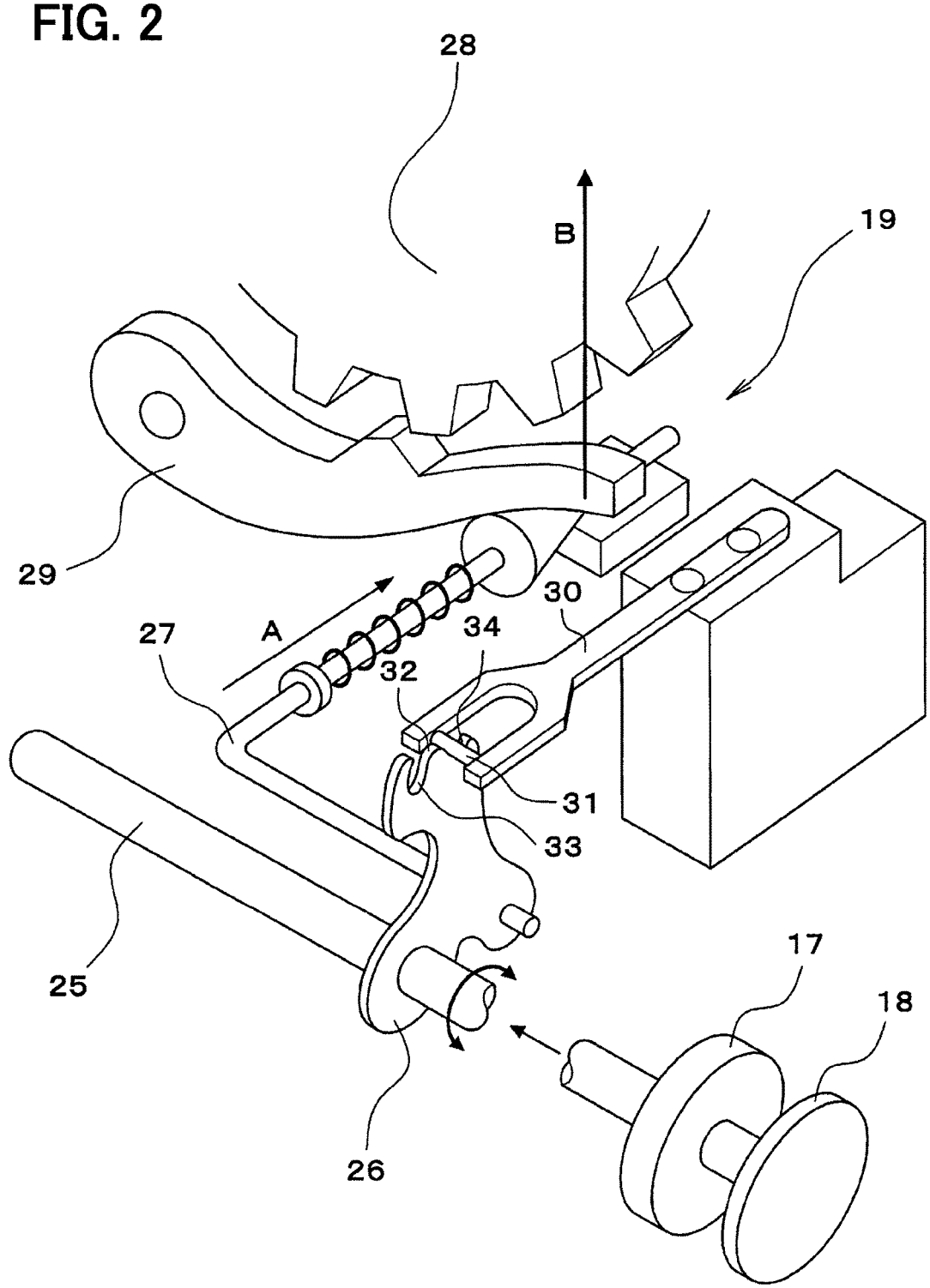
FIG. 2 shows a configuration of a shift control mechanism.

FIG. 2 shows a configuration of the shift mechanism 19. In the following description, a "shift range" refers to the P range or the non-P range and does not include the R, N, D and B ranges included in the non-P range. The shift mechanism 19 includes a shaft 25 rotated by the motor 17, a detent plate 26 rotating according to the rotation of the shaft 25, a rod 27 operating according to the rotation of the detent plate 26, a parking gear 28 fixed to an output shaft of a transmission (not shown), a parking lock pole 29 for locking the parking gear 28, and a detent spring 30 and a roller 31 restricting the rotation of the detent plate 26 to fix the shift range. The detent plate 26 functions as shift means driven by the motor 17 for switching the shift range.

FIG. 2 shows a state of the shift range which is in the non-P range. In such a state, as the parking lock pole 29 does not lock the parking gear 28, rotations of the drive shaft of the vehicle cannot be prevented. Starting from such a state, the motor 17 rotates the shaft 25 in the clockwise direction so that the rod 27 is pushed via detent plate 26 in the direction indicated by the arrow A in FIG. 2. The parking lock pole 29 is accordingly pushed up by a tapered portion on an end of the rod 27 in the direction indicated by the arrow B in FIG. 2. As the detent plate 26 rotates, the roller 31 of the detent spring 30 that is located in one of depressions on the top of the detent plate 26, namely located at a non-P range position 34, climbs over a crest 32 and then down into the other depression, namely a P range position 33. The roller 31 is provided to the detent spring 30 in such a manner that the roller is rotatable in the axial direction. When the detent plate 26 rotates to such a degree that allows the roller 31 to move to the P range position 33, the parking lock pole 29 is pushed up to a position where pole 29 engages with the parking gear 28. In such a way, the drive shaft of the vehicle is mechanically fixed and the shift range is switched to the P range.

The shift control system 11 of the present embodiment controls, when the shift range is switched, the rotational amount of the motor 17 in order to reduce a load on the shift mechanism 19 that includes the detent plate 26, the detent spring 30 and the shaft 25. As a result, the P-ECU 16 lessens impact that occurs when the roller 31 of the detent spring 30 climbs over the crest 32 and then drops.

Figure 3:
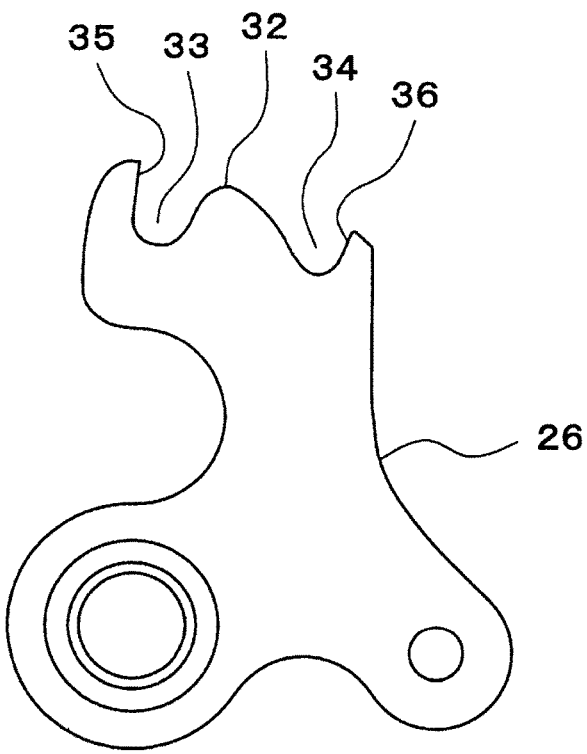
FIG. 3 shows a configuration of a detent plate.

FIG. 3 shows a configuration of the detent plate 26. Of the shown two surfaces of each depression that extend from the bottom of the depression, the surface that is located away from the crest 32 is called "wall". In other words, the wall is present at a position where the wall hits against the roller 31 of the detent spring 30 when the roller 31 climbing over the crest 32 drops onto the bottom of the depression without the control hereinafter described by the P-ECU 16. The wall of the P range position 33 is called "P wall" and the wall of the non-P range position 34 is called "non-P wall".

In the present embodiment, the P range is a "first shift position" in the claims, and the P wall 35 is a "dead-end (of rotation)" in the claims. Further, the non-P range is a "second shift position" in the claims, and the non-P wall 36 is a "dead-end (of rotation)" in the claims.

When the roller 31 moves from the P range position 33 to the non-P range position 34, the P-ECU 16 controls the motor 17 so that the non-P wall 36 does not hit against the roller 31. Specifically, the P-ECU 16 stops the rotation of the motor 17 at a position which allows the non-P wall 36 to stop immediately before hitting against the roller 31. This position is called a "non-P target rotation position" in the claims. Moreover, the P-ECU 16 controls the motor 17 so that the P wall 35 does not hit against the roller 31 when the roller 31 moves from the non-P range position 34 to the P range position 33. Specifically, the P-ECU 16 stops the rotation of the motor 17 at a position which allows the P wall 35 to stop immediately before hitting against the roller 31. This position is called a "P target rotation position" in the claims. Under the control of the motor 17 by the P-ECU 16, the load exerted in switching the shift range on the shift mechanism 19 including the detent plate 26, the detent spring 30 and the shaft 25, for example, can remarkably be reduced. By the reduction of the load, the weight and cost of the shift mechanism 19 can accordingly be reduced.

Figure 4:
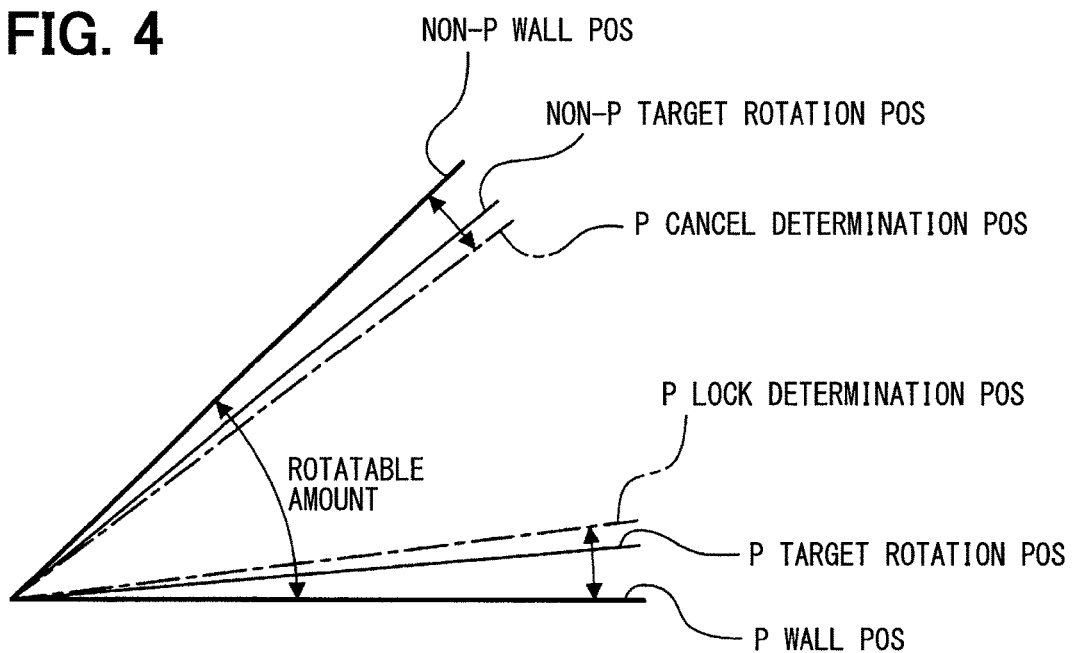
FIG. 4 illustrates a method of controlling a motor.

FIG. 4 illustrates a method of controlling the motor 17. The motor 17 causes the detent plate 26 to rotate. The rotation of the motor 17 is restricted by the P wall 35 and the non-P wall 36. In FIG. 4, the position of the P wall 35 and the position of the non-P wall 36 in controlling the rotation of the motor 17 are conceptually shown. The region between "P wall position" and "non-P wall position" is called "rotatable amount" of the motor 17. The rotatable amount includes "actual rotatable amount" determined from a count value of the encoder 18 and "by-design rotatable amount" determined by design.

A current shift range is identified when the rotational amount of the motor 17 is in a region between the P wall position or the non-P wall position and a position away from the P or non-P wall position by a predetermined rotational amount. The shift range is determined on the basis of the P lock position (hereinafter P lock determination position) and on the basis of the P cancel position (hereinafter P cancel determination position). The region between the P wall position and the P lock determination position as well as the region between the non-P wall position and the P cancel determination position are defined each as a shift range determination region.

Specifically, when the rotational amount of the motor 17 that is detected by the encoder 18 is in the region between the P wall position and the P lock determination position, it is determined that the current shift range is the P range. On the other hand, when the rotational amount of the motor 17 is in the region between the non-P wall position and the P cancel determination position, it is determined that the current shift range is the non-P range. Further, when the rotational amount of the motor 17 is in the region between the P lock determination position and the P cancel determination position, it is determined that the shift range is uncertain/unknown or shift switching is now currently being performed. The determinations above are made by the P-ECU 16.

The P-ECU 16 rotates the motor 17, when switching from the non-P range to the P range, so that the rotation position of the motor 17 is controlled to match the P target rotation position, and, when switching from the P range to the non-P range, so that the rotation position of the motor 17 is controlled to match the non-P target rotation position.

The P target rotation position is set between the P wall position and the P lock determination position. The P target rotation position corresponds to the position which allows the P wall 35 not to hit against the roller 31 of the detent spring 30 when the non-P range is switched to the P range and is set with a predetermined margin from the P wall position. This margin is set with an allowance in consideration of backlash due to, for example, secular changes. Thus, the secular changes can be absorbed until the system is used by a certain number of times, and the impact/hitting of the P wall 35 against the roller 31 at the time of the shift range switching can be avoided.

Similarly, the non-P target rotation position is set between the non-P wall position and the P cancel determination position. The non-P target rotation position corresponds to the position which allows the non-P wall 36 not to hit against the roller 31 of the detent spring 30 when the P range is switched to the non-P range and is set with a predetermined margin from the non-P wall position. This margin is set with an allowance in consideration of backlash due to, for example, secular changes. Thus, the secular changes can be absorbed until the system is used by a certain number of times, and the impact/hitting of the non-P wall 36 against the roller 31 can be avoided a time of the shift range switching. The margin from the non-P wall position and the margin from the P wall position are not necessarily equal to each other and may be different depending on the shape of the detent plate 26, for example.

The method of controlling the motor 17 is heretofore described on the precondition that the P wall position and the non-P wall position have been detected. The P wall position and the non-P wall position serve as reference positions each for defining the region for determining the shift range and the target rotation position for the P range position 33 or the non-P range position 34. A description is now given below regarding a method of controlling the position of the motor 17 using the encoder 18 which detects relative positional information, specifically of a method of detecting, or learning, the wall position serving as the reference position.

The P-ECU 16 or the V-ECU 15 stores a shift range which was selected when the vehicle power switch 14 was lastly turned off. When the vehicle power switch 14 is thereafter turned on, the P-ECU 16 sets the stored shift range as a current shift range. By a wall-position detection control, a wall position for the current shift range is detected. If the last shift range is not stored, the V-ECU 15 determines the current shift range based on the vehicle speed. Specifically, if the vehicle speed is a low speed of at most 3 km/h, the V-ECU 15 determines that the current shift range is the P range and, if the vehicle speed is a medium-to-high speed higher than 3 km/h, the V-ECU 15 determines that the current shift range is the non-P range. If the last shift range is not stored and the vehicle speed is a medium-to-high speed, such a state corresponds to a state where the power was momentarily turned off when the vehicle was running and the data on the current shift range was lost. In most of the cases, however, it is determined that the vehicle speed is a low-speed when the vehicle power switch 14 is turned on, and accordingly it is determined that the current shift range is the P range.

Figure 5A:
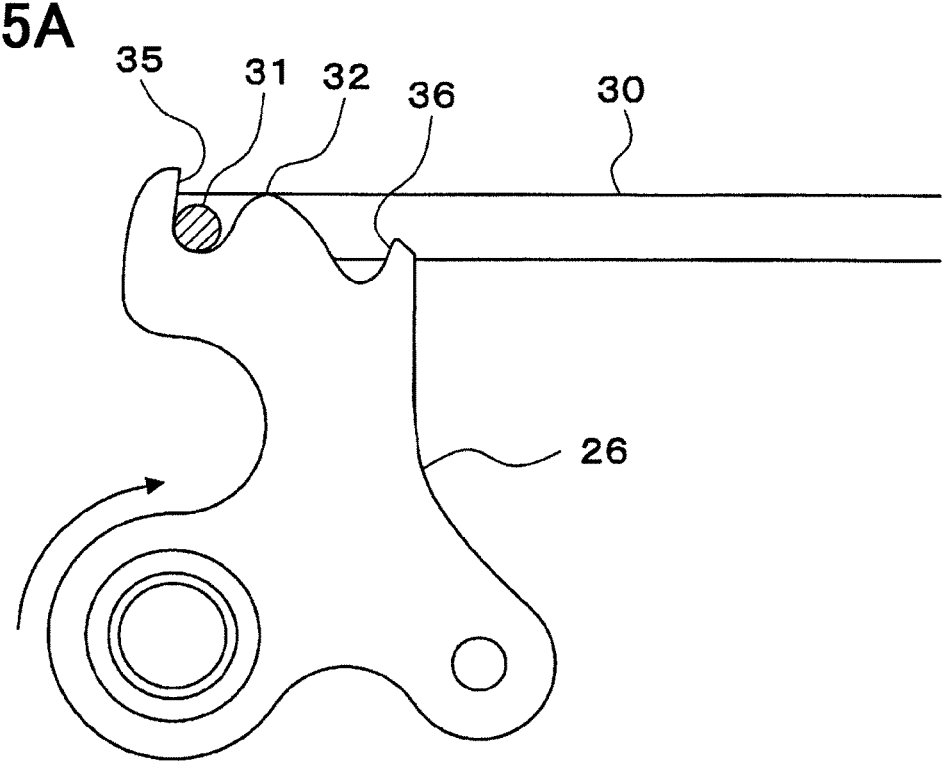
FIG. 5A illustrates a control method for detecting a P wall position and FIG. 5B illustrates a control method for detecting a non-P wall position.

FIG. 5A illustrates a control method for detecting the P wall position. According to the control method for detecting the P wall position, the detent plate 26 is rotated by the motor 17 in the clockwise direction, namely the direction in which the P wall 35 moves toward the roller 31 of the detent spring 30 to cause the P wall 35 to contact the roller 31 (i.e., to hit a dead-end of rotation on a P range side of the shift mechanism 19). Further, the rotation speed or the angular velocity of the motor 17 is calculated based on the output signals from the encoder 18.

When the rotation speed or the angular velocity of the motor 17 falls down to or below a threshold value, e.g., a 90% value or a 80% value of the maximum speed, it is determined that the P wall 35 hits the roller 31 of the detent spring 30 (i.e., hits the dead-end of rotation on the P range side), and detects such a rotation position of the motor 17 (i.e., the encoder count) as a tentative P wall position. Further, a warpage amount or a warpage angle of the detent spring 30 at such moment according to an application voltage to the motor 17 or according to the battery voltage and the output torque of the motor 17 is calculated based on a map, an equation, or the like. Alternatively, the warpage amount/angle may be detected by using sensors, or the like.

Then, a correction value corresponding to the warpage amount/angle of the detent spring 30 is looked up from the map or is calculated by the equation, and the tentative P wall position is corrected by such correction value, and the P wall position is determined and learned. By determining the P wall position, the P lock determination position and the P target rotation position are respectively set.

The maps and/or the equations for the calculation of the warpage amount/angle and the correction value thereof may be generated based on a test and a design data, and are stored in the ROM of the P-ECU 16 or the like. Further, if the warpage amount/angle of the detent spring 30 are negligible, the rotation position of the motor 17 at the time of falling of its rotation speed down to or below the threshold value may be learned as the P wall position.

Figure 5B:
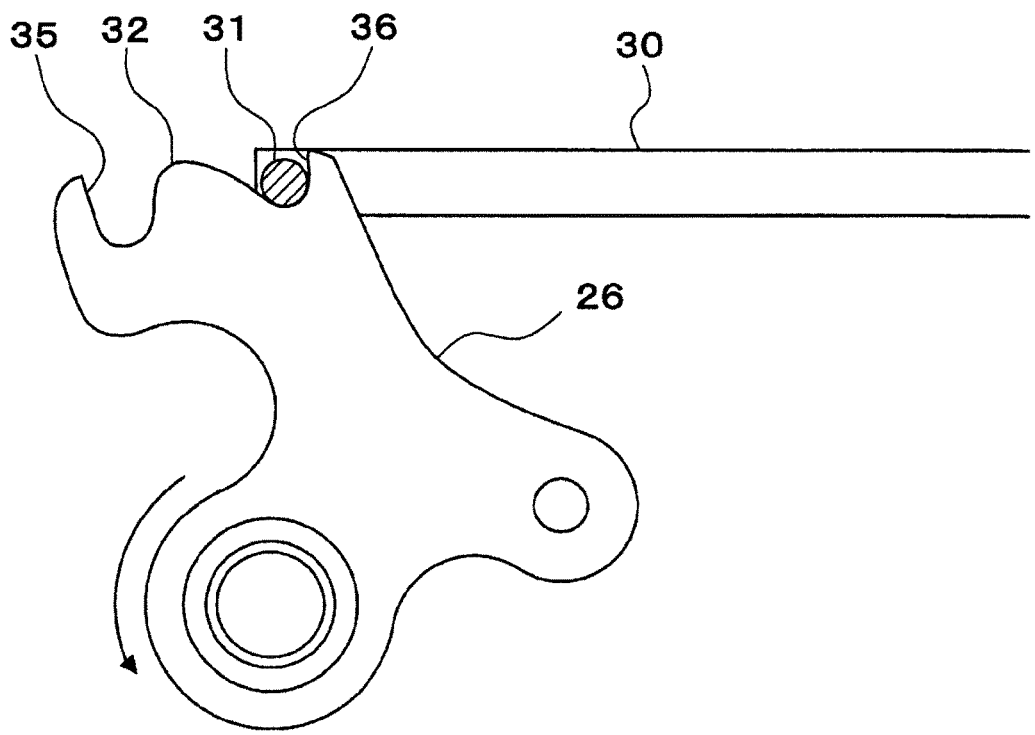

FIG. 5B illustrates a control method for detecting the non-P wall position. According to the control method for detecting the non-P wall position, the detent plate 26 is rotated by the motor 17 in the counter-clockwise direction, namely the direction in which the non-P wall 36 moves toward the roller 31 of the detent spring 30 to cause the non-P wall 36 to contact the roller 31 (i.e., to hit the a dead-end of rotation of a non-P range side of the shift mechanism 19). Further, the rotation speed or the angular velocity of the motor 17 is calculated based on the output signals from the encoder 18.

When the rotation speed or the angular velocity of the motor 17 falls down to or below a threshold value, e.g., a 90% value or a 80% value of the maximum speed, it is determined that the non-P wall 36 hits the roller 31 of the detent spring 30 (i.e., hits the dead-end of rotation on the non-P range side), and detects such a rotation position of the motor 17 (i.e., the encoder count) as a tentative non-P wall position. Further, a warpage amount or a warpage angle of the detent spring 30 at such moment according to an application voltage to the motor 17 or according to the battery voltage and the output torque of the motor 17 is calculated based on a map, an equation, or the like. Alternatively, the warpage may be detected by using sensors, or the like.

Then, a correction value corresponding to the warpage amount/angle of the detent spring 30 is looked up from the map or is calculated by the equation, and the tentative non-P wall position is corrected by such correction value, and the non-P wall position is determined for the learning. By determining the non-P wall position, the P cancel determination position and the non-P target rotation position are respectively set.

The maps and/or the equations for the calculation of the warpage amount/angle and the correction value thereof may be generated based on a test and a design data, and are stored in the ROM of the P-ECU 16 or the like. Further, if the warpage amount/angle of the detent spring 30 are negligible, the rotation position of the motor 17 at the time of fall of its rotation speed down to or below the threshold value may be learned as the non-P wall position.

In such a way, under the control for learning the wall position, the wall position for the current shift range is detected. If an actual rotatable amount between the P wall position and the non-P wall position has already been detected, the actual rotatable amount may be used to calculate a wall position for the other shift range. The actual rotatable amount may be detected, by the wall-position detection control to detect a wall position for one of the shift ranges, followed by the wall-position detection control to detect a wall position for the other shift range, and thereby measuring the region between the detected two wall positions. The P-ECU 16 stores the measured actual rotatable amount. Once the actual rotatable amount is obtained, the P-ECU 16 which has detected a wall position for one shift range can set a wall position for the other shift range as a position distant from the wall position for the one shift range by the actual rotational amount, and accordingly, the P-ECU 16 can set the shift range determination region and the target rotation position for the two shift ranges each.

It is seen from the above that the detection/learning of both wall positions for the P range and the non-P range respectively may be performed when the P-ECU 16 does not store the actual rotatable amount. For example, upon shipment of the vehicle from a factory or if the data in the P-ECU 16 is lost, both of the wall positions are detected and learned. Further, even if the actual rotatable amount is stored, both of the wall positions may be detected and learned each time the shift position switching or a trip of the vehicle is performed by a predetermined number of times. For example, if the shift range is switched a few ten thousands of times, the backlash amount due to wearing increases, resulting in an error of the actual rotatable amount. In such a case, the actual rotatable amount may newly be measured to detect and learn the wall position and thereby address the problem of secular changes. In the above, the trip of the vehicle may be counted as an ON-to-ON cycle of the vehicle power switch 14, or as an ON-to-OFF cycle of the switch 14.

Figures 6, 8:
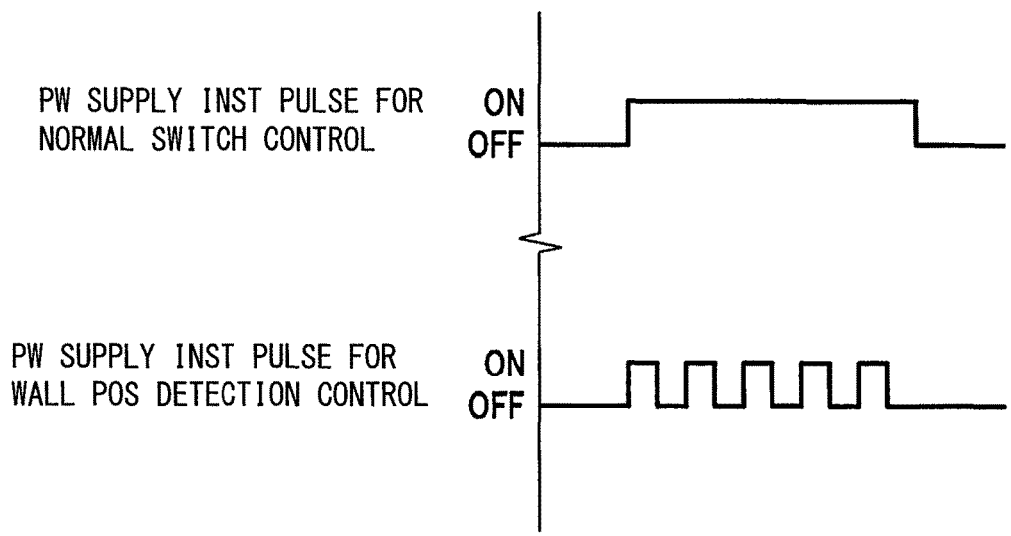
FIG. 6 shows an exemplary control of learning of the wall position.
FIG. 8 shows a waveform of each power supply instruction pulse applied to the motor.

FIG. 6 shows an exemplary control of learning of the wall position using data stored on a previous trip. If the shift range when the previous trip is finished is the P range, the P wall position learning is performed first and, if the actual rotatable amount has been detected, the non-P wall position learning is not performed. On the other hand, if the actual rotatable amount is unknown, the non-P wall position learning is performed. The non-P wall position learning is performed when the driver instructs to switch the shift range to the non-P range. At such a time, the P-ECU 16 switches the shift range from the non-P range to the P range, for performing the P wall position learning. After learning the both wall positions, the P-ECU 16 measures, i.e., calculates, the actual rotatable amount from the P wall position to the non-P wall position, and stores the amount.

If the shift range is the non-P range when a previous trip is finished, the non-P wall position learning is performed first and, if the actual rotatable amount has been detected, the P wall position learning is not performed. On the other hand, if the actual rotatable amount is unknown, the P wall position learning is performed. The P wall position learning is performed when the driver instructs to switch the shift range to the P range. The P-ECU 16 switches, at such a time, the shift range to the P range for performing the P wall position learning. After learning the both wall positions, the P-ECU 16 measures, i.e., calculates, the actual rotatable amount from the P wall position to the non-P wall position, and stores the amount.

If the shift range when the previous trip is finished is unknown, the V-ECU 15 determines the current shift range based on the vehicle speed, and sends an instruction to detect and learn the wall position to the P-ECU 16. When it is revealed from such an instruction that the current shift range is set to the P range, the P-ECU 16 first performs the P wall position learning, and thereafter performs the non-P wall position learning in response to a shift instruction from the driver. On the other hand, if it is revealed from the instruction that the current shift range is set to the non-P range, the P-ECU 16 first performs the non-P wall position learning and thereafter performs the P wall position learning in response to a shift instruction from the driver.

FIG. 7 illustrates an exemplary method of calculating a target rotation position of the motor 17. The example in FIG. 7 assumes that the count value of the encoder 18 is counted up as the motor 17 rotates from the P wall position toward the non-P wall position.

If the P wall position and the non-P wall position are already learned and the actual rotatable amount has been detected, the P target rotation position is set based on the P wall position, and the non-P target rotation position is set based on the non-P wall position. More practically, the P target rotation position is set to "P wall position+margin," and the non-P target rotation position is set to "non-P wall position−margin."

If the P wall position has already been learned and the non-P wall position is unknown (i.e., not yet learned), the P target rotation position and the non-P target rotation position are set based on the P wall position. More practically, if the actual rotatable amount has already been detected, the P target rotation position is set to "P wall position+margin" and the non-P target rotation position is set to "P wall position+actual rotatable amount−margin." If the actual rotatable amount is unknown, the P target rotation position is set to "P wall position+margin" and the non-P target rotation position is set to "P wall position+by-design rotatable amount." Here, the by-design rotational amount is set to a certain value in consideration of the margin.

If the P wall position is unknown (i.e., not yet learned) and the non-P wall position has already been learned, the P target rotation position and the non-P target rotation position are set based on the non-P wall position. More practically, if the actual rotatable amount has already been detected, the P target rotation position is set to "non-P wall position−actual rotational amount+margin" and the non-P target rotation position is set to "non-P wall position−margin." If the actual rotatable amount is unknown, the P target rotation position is set to "non-P wall position−by-design rotatable amount" and the non-P target rotation position is set to "non-P wall position-margin."

In case that the count value of the encoder 18 is counted up as the motor 17 rotates from the non-P wall position toward the P wall position, the following process applies.

If the P wall position and the non-P wall position are already learned and the actual rotatable amount has been detected, the non-P target rotation position is set based on the non-P wall position, and the P target rotation position is set based on the P wall position. More practically, the non-P target rotation position is set to "non-P wall position+ margin," and the P target rotation position is set to "P wall position−margin."

If the non-P wall position has already been learned and the P wall position is unknown (i.e., not yet learned), the non-P target rotation position and the P target rotation position are set based on the non-P wall position. More practically, if the actual rotatable amount has already been detected, the non-P target rotation position is set to "non-P wall position+ margin" and the P target rotation position is set to "non-P wall position+actual rotatable amount−margin." If the actual rotatable amount is unknown, the non-P target rotation position is set to "non-P wall position+margin" and the P target rotation position is set to "non-P wall position+by-design rotatable amount."

If the non-P wall position is unknown (i.e., not yet learned) and the P wall position has already been learned, the non-P target rotation position and the non-P target rotation position are set based on the P wall position. More practically, if the actual rotatable amount has already been detected, the non-P target rotation position is set to "P wall position−actual rotational amount+margin" and the P target rotation position is set to "P wall position−margin." If the actual rotatable amount is unknown, the non-P target rotation position is set to "P wall position−by-design rotatable amount" and the P target rotation position is set to "P wall position-margin."

Further, in the present embodiment, the P-ECU 16 controls a rotational drive of the motor 17 so that a per-unit-time output of the motor 17 becomes smaller at a time of the learning of the P wall position or the non-P wall position than at a time of the switching between the shift ranges.

More practically, as in FIG. 8, which shows a waveform of each power supply instruction pulse applied to the motor 17, when the shift range is normally switched, a signal of a power supply instruction pulse having a long high period is applied to the motor 17. When the wall position learning is performed, a signal of a power supply instruction pulse is applied to the motor 17 so that a per-unit-time output of the motor 17 is made to be lower than the output of the motor 17 at the normal shift range switching time, by, for example, reducing an ON width of the pulse of such instruction. By slowing down the rotation speed of the motor 17 when the wall position is learned, an impact between the wall and the roller 31 can be reduced.

Hereafter, the contents of processing of each of the routines in FIGS. 9 to 12 which is executed by the P-ECU 16 are described, for example.

(Wall Position Learn Control Main Routine)

Figure 9:
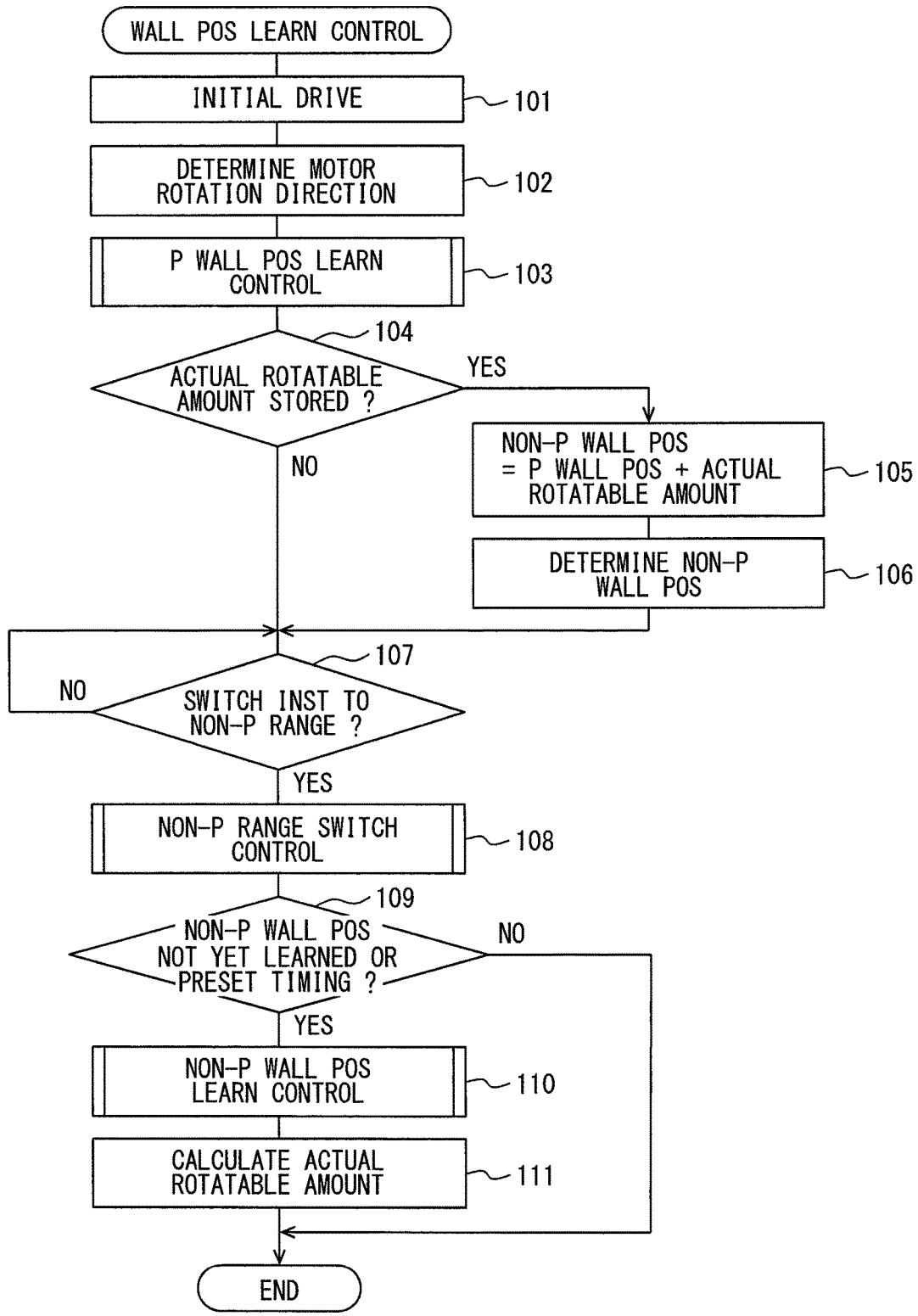
FIG. 9 is a flowchart of a main routine of a wall position learn control according to one embodiment.

The wall position learn control main routine shown in FIG. 9 is executed after the power ON of the P-ECU 16. In the following, the shift range at the time of power ON of the P-ECU 16 is the P range, as an example.

When a driver turns the vehicle's power switch 14 to ON and a power supply to the shift range switching control system 11 is started, it is first determined by an initial driver of the motor 17 in Step 101 what a relation between a power supply phase and an encoder counted value (i.e., an encoder count) for the control of the motor 17 is. That is, a relationship between the power supply phase and the encoder count is learned by the P-ECU 16 in Step 101.

In such an initial drive, the switching of the power supply phase of the motor 17 is performed by an open-loop control for one round at a preset time schedule, thereby (i) finding a matching relationship between the power supply phase and the rotation position of the motor 17 at some point in such round based on counting of the output signal from the encoder 18 and (ii) learning a relation therebetween at an end time of such an initial drive.

Then, the process proceeds to Step 102, and a rotation direction of the motor 17 for the learning of the P wall position is determined based on a fact that the current shift range is the P range. More practically, the rotation direction of the motor 17 is determined so that the P wall 35 of the detent plate 26 hits the roller 31 of the detent spring 30.

Then, proceeding to Step 103, and the P wall position which is a reference position on the P range side is learned by performing the P wall position learn control routine in FIG. 10 which is mentioned later.

Then, the process proceeds to Step 104, and it is determined whether an actual rotatable amount of the motor 17 is stored, which has already been detected. In such a Step 104, when it is determined that the actual rotatable amount is stored, the process proceeds to Step 105, and the non-P wall position is calculated in the following manner based on the P wall position and the actual rotatable amount.

If the encoder count is incremented, i.e., counts up, in a rotation of the motor 17 from the P wall position to the non-P wall position, the non-P wall position is calculated as an added position of the P wall position and the actual rotatable amount.

(Equation)Non-*P* wall position=*P* wall position+actual rotatable amount

If the encoder count is decremented, i.e., counts down, in a rotation of the motor 17 from the non-P wall position to the P wall position, the non-P wall position is calculated as a position of difference between the P wall position and the actual rotatable amount.

(Equation)Non-*P* wall position=*P* wall position−actual rotatable amount

Then, the process proceeds to Step 106, and the non-P wall position is determined and learned, and the process further proceeds to Step 107.

On the other hand, in the above-mentioned Step 104, when it is determined that the actual rotatable amount is not stored, processing of Steps 105 and 106 are skipped, and the process proceeds to Step 107.

In Step 107, it is determined whether the driver has instructed to switch the range to the non-P range. When it is determined that there is no switch instruction to the non-P range, the process continues to monitor the switch instruction to the non-P range.

On the other hand, when it is determined that the switch instruction to the non-P range in the above-mentioned Step 107, the shift range is switched from the P range to the non-P range by executing the non-P range switch control routine of FIG. 11 after proceeding to Step 108 that is mentioned later.

Then, after completing the non-P range switch control and proceeding to Step 109, it is determined whether the non-P wall position has not yet learned (i.e., is unknown), or whether it is a preset timing. Here, the preset timing may be set as a condition that the number of switchings of the shift range has reached a preset number or a condition that the number of trips of the vehicle has reached a preset number.

In such a Step 109, when it is determined that the non-P wall position is already learned and it is determined that the preset timing condition is not fulfilled, the execution of the present routine is finished.

On the other hand, when it is determined that the non-P wall position has not yet learned OR when it is determined that the preset timing condition is fulfilled in the above-mentioned Step 109, the process proceeds to Step 110 and executes the non-P wall position learn control routine of FIG. 12 which is mentioned later, for the learning of the non-P wall position which is a reference position on the non-P range side.

Then, the process proceeds to Step 111 and the actual rotatable amount from the P wall position to the non-P wall position is measured (i.e., is calculated). The actual rotatable amount is stored in the P-ECU 16 for the setting of the wall position in the subsequent trip of the vehicle.

(P Wall Position Learn Control Routine)

Figure 10:
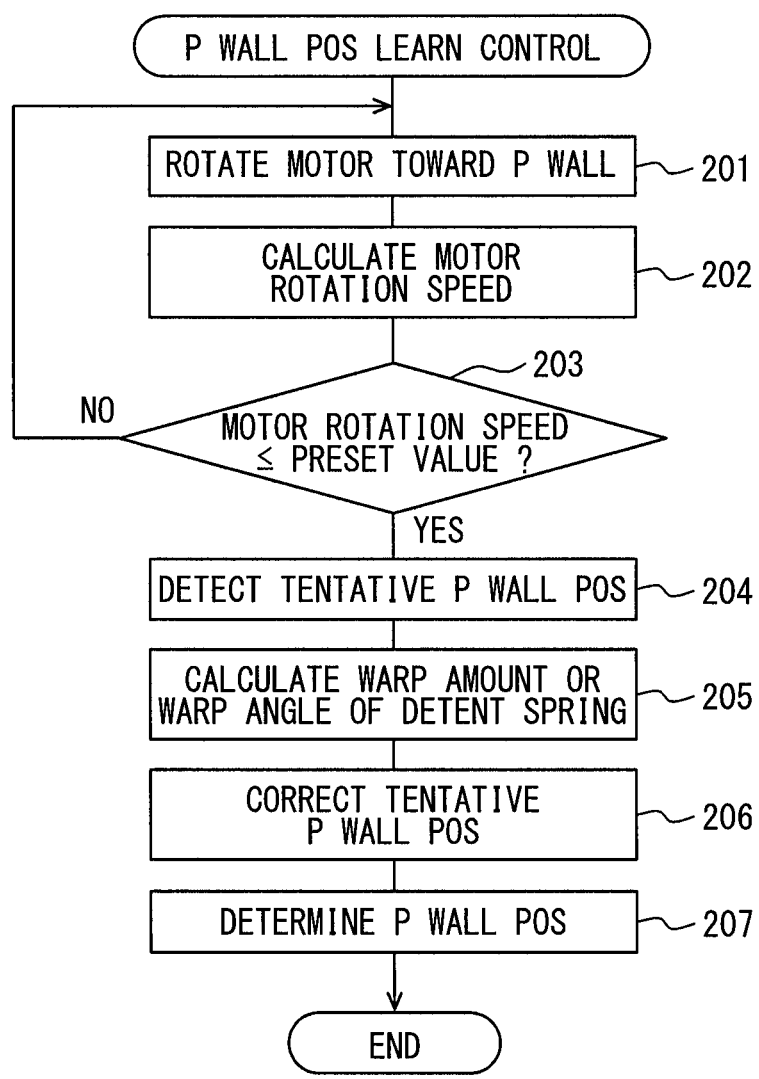
FIG. 10 is a flowchart of a P wall position learn control routine.

The P wall position learn control routine shown in FIG. 10 is a subroutine executed at Step 103 of the wall position learn control main routine in FIG. 9. When the routine is started, the motor 17 is first rotated at Step 201 so that the P wall 35 of the detent plate 26 is rotated to hit the roller 31 of the detent spring 30.

Then, the process proceeds to Step 202, and the rotation speed or the angular velocity of the motor 17 is calculated based on the output signal of encoder 18.

Then, the process proceeds to Step 203, and it is determined whether the rotation speed or the angular velocity of the motor 17 falls down to or below a threshold value. Here, the threshold value is set to a value that is a slightly lower than the maximum value (i.e., a peak value) of the rotation speed or the angular velocity of the motor 17, e.g., 80 to 90% thereof.

In Step 203, when it is determined that the rotation speed or the angular velocity of the motor 17 is higher than the threshold value, the process returns to the above-mentioned Step 201.

Then, after repeating 201 to 203 part of the flowchart, when it is determined that the rotation speed or the angular velocity of the motor 17 has fallen to or below the threshold value at the above-mentioned Step 203, assuming that the P wall 35 of the detent plate 26 hit the roller 31 of the detent spring 30, and the process proceeds to Step 204, and the rotation position (i.e., the encoder count) of the motor 17 is detected as a tentative P wall position.

Then, the process proceeds to Step 205, and the warpage amount or the warpage angle of the detent spring 30 corresponding to the application voltage to the motor 17, or according to the battery voltage or the output torque of the motor 17, is calculated based on a map, an equation, or the like. Alternatively, the warpage amount/angle of the detent spring 30 may be detected by using sensors, or the like.

Then, after proceeding to Step 206, a correction value corresponding to the warpage amount/angle of the detent spring 30 is looked up from the map or is calculated by the equation, and the tentative P wall position is corrected by such correction value, and the P wall position is determined and learned after proceeding to Step 207. Further, if the warpage amount/angle of the detent spring 30 are negligible, the rotation position of the motor 17 at the time of falling of its rotation speed or the angular velocity down to or below the threshold value may be learned as the P wall position.

(Non-P Range Switch Control Routine)

Figure 11:
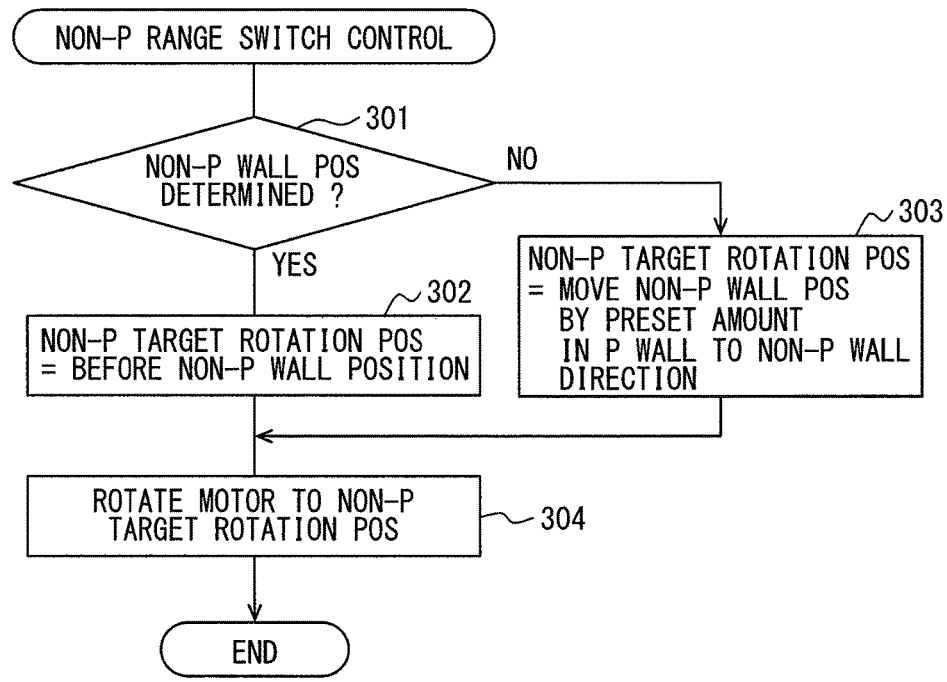
FIG. 11 is a flowchart of a non-P shift position switch control routine.

The non-P range switch control routine shown in FIG. 11 is a subroutine executed at Step 108 of the wall position learn control main routine of FIG. 9. When the routine is started, the process determines in Step 301 whether the non-P wall position is determined (i.e., whether it is already learned) at Step 301.

When it is determined that the non-P wall position is determined in Step 301, the non-P target rotation position is set to a rotation position before the non-P wall position after proceeding to Step 302, and the process proceeds to Step 304, and the motor 17 is rotated to the non-P target rotation position, and the shift range is switched from the P range to the non-P range. Thereby, switching of the shift range to the non-P range is enabled, without rotating the non-P wall 36 of the detent plate 26 to hit the roller 31 of the detent spring 30.

On the other hand, in the above-mentioned Step 301, when it is determined that the non-P wall position has not yet been determined, the process proceeds to Step 303, and the non-P target rotation position may be set to a rotation position that is closer to the non-P wall from the P wall position by a preset rotation amount. Then, the process proceeds to Step 304, and the motor 17 is rotated to the non-P target rotation position, and the shift range is switched from the P range to the non-the P range.

(Non-P Wall Position Learn Control Routine)

Figure 12:
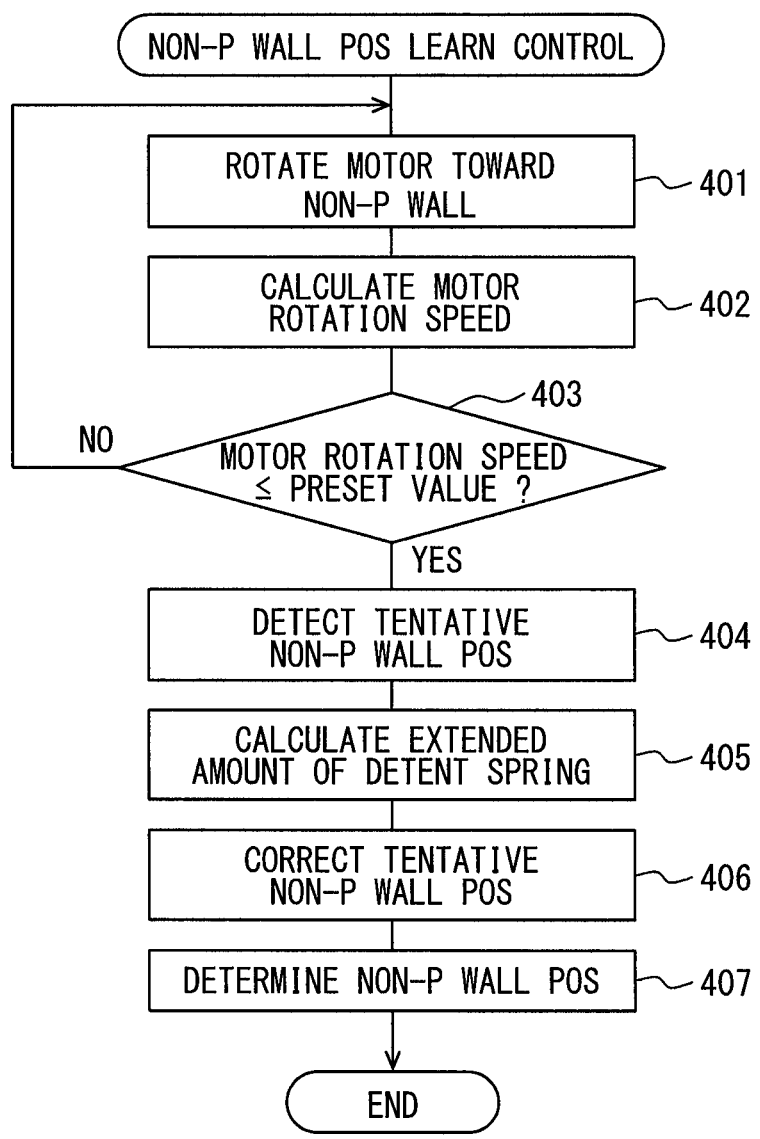
FIG. 12 is a flowchart of a non-P wall position learn control routine.

The non-P wall position learn control routine shown in FIG. 12 is a subroutine executed at Step 110 of the wall position learn control main routine in FIG. 9. When the routine is started, the process in Step 401 rotates the motor 17 so that the non-P wall 36 of the detent plate 26 hits the roller 31 of the detent spring 30.

Then, the process proceeds to Step 402, and the rotation speed or the angular velocity of the motor 17 is calculated based on the output signal of encoder 18.

Then, the process proceeds to Step 403, and it is determined whether the rotation speed or the angular velocity of the motor 17 falls down to or below the threshold value. Here, the threshold value is set to a value that is a slightly lower than the maximum value (i.e., a peak value) of the rotation speed or the angular velocity the motor 17, e.g., 80 to 90% thereof.

In Step 403, when it is determined that the rotation speed or the angular velocity of the motor 17 is higher than the threshold value, the process returns to the above-mentioned Step 401.

Then, after repeating 401 to 403 part of the flowchart a couple of times, for example, when it is determined that the rotation speed or the angular velocity of the motor 17 has fallen to or below the threshold value at the above-mentioned Step 403, assuming that the P wall 35 of the detent plate 26 hit the roller 31 of the detent spring 30, and the process proceeds to Step 404, and the rotation position (i.e., the encoder count) of the motor 17 is detected as a tentative non-P wall position.

Then, the process proceeds to Step 405, and the extended amount of the detent spring 30 corresponding to the application voltage to the motor 17 (or according to the battery voltage, or according to the output torque of the motor 17, is calculated based on a map, an equation, or the like. Alternatively, the extended amount of the detent spring 30 may be detected by using sensors, or the like.

Then, after proceeding to Step 406, a correction value corresponding to the extended amount of the detent spring 30 is looked up from the map or is calculated by the equation, and the tentative non-P wall position is corrected by such correction value, and the non-P wall position is determined and learned after proceeding to Step 407. Further, if the extended amount of the detent spring 30 is negligible, the rotation position of the motor 17 at the time of falling of the rotation speed or the angular velocity down to or below the threshold value may be learned as the non-P wall position.

In such an example described above, when the shift range is the P range at the time of the power ON of the P-ECU 16, the P wall position learn control is executed which learns the P wall position as a reference position on the P range side. In the P wall position learn control, the motor 17 is rotated so that the P wall 35 of the detent plate 26 hits the roller 31 of the detent spring 30. When the rotation speed or the angular velocity of the motor 17 falls down to or below the threshold value, assuming that the P wall 35 of the detent plate 26 hit the roller 31 of the detent spring 30, the P wall position at such moment is learned based on the rotation position of the motor 17.

In such manner, the rotation position of the motor 17 corresponding to the P wall 35 of the detent plate 26 (i.e., a dead-end of rotation on the P range side) can be learned as the P wall position. Further, when the rotation speed or the angular velocity of the motor 17 falls down to or below the threshold value, the rotation of the motor 17 is stopped, preventing a forceful rotation of the motor 17 at the dead-end or rotation (i.e., preventing the motor 17 and/or the switch mechanism 19 from being in a highly-warped state). Thus, the mechanical load of the motor 17 and/or the switch mechanism 19 is lightened, thereby improving the durability of the motor 17 and/or the switch mechanism. Further, the learning time of the P wall position (i.e., time taken to complete the learning of the P wall position) can be reduced, and the power consumption of the motor 17 is reduced. Therefore, the P wall position is learned while improving the durability of the motor 17 and/or the switch mechanism 19 and reducing the learning time of the P wall position and the power consumption of the motor 17.

Further, in the present embodiment, when the actual rotatable amount of the motor 17 is already stored (i.e., is already detected) after learning the P wall position, the non-P wall position is calculated based on the actual rotatable amount and the P wall position of the motor 17. In such way, the non-P wall position can be easily set based on the rotatable amount and the P wall position of the motor 17 without executing the non-P wall position learn control.

Further, in the present embodiment, when the actual rotatable amount of the motor 17 is not stored (i.e., is not yet detected) after learning the P wall position, the non-P wall position learn control is executed for the learning of the non-P wall position, which is a reference position on the non-the P range side, when the shift range is switched from the P range to the non-P range.

In the non-P wall position learn control, the motor 17 is rotated so that the non-P wall 36 of the detent plate 26 hits the roller 31 of the detent spring 30. When the rotation speed or the angular velocity of the motor 17 falls down to or below the threshold value, assuming that the non-P wall 36 of the detent plate 26 hit the detent spring 30, and the non-P wall position at such moment is learned based on the rotation position of the motor 17.

Thus, when the shift range is switched from the P range to the non-the P range, the learning of the non-P wall position is efficiently performed by performing the non-P wall position learn control. Further, while improving the durability of the motor 17 and/or the switch mechanism 19 and reducing the learning time of the P wall position and the power consumption of the motor 17, the non-P wall position is learned.

Further, in the present embodiment, for the purpose of correcting an influence of the secular changes in the switch mechanism 19, the non-P wall position learn control is performed at a preset timing. In such manner, the secular change of the learning value of the non-P wall position is corrected by the non-P wall position learn control, i.e., by the re-learning of the non-P wall position.

Further, in the present embodiment, the actual rotatable amount of the motor 17 is calculated based on the P wall position and the non-P wall position. In such manner, the actual rotatable amount of the motor 17 from the P wall position to the non-P wall position is calculable with sufficient accuracy. Further, by storing the actual rotatable amount of the motor 17 calculated in the above manner, one of the two reference positions is easily calculable in the next trip based on the other one of the two reference positions and the actual rotatable amount of the motor 17. That is, for example, if the P wall position is stored, based on the P wall position and the actual rotatable amount of the motor 17, the non-P wall position is easily calculable by performing the P wall position learn control only.

Further, in the present embodiment, the per-unit-time output of the motor 17 is configured to have a smaller value at the time of learning the P wall or the non-P wall by rotating the motor 17 than at the time of switching between the shift ranges. In such manner, the load of the motor 17 or the switch mechanism 19 for learning the P wall position or the non-P wall position is reduced.

Further, in the present embodiment, the P target rotation position (i.e., a target rotation position of the motor 17 at the time of switching to the P range) and the non-P target rotation position (i.e., a target rotation position of the motor 17 at the time of switching to the non-the P range) are set based on the P wall position or the non-P wall position. In such manner, the P target rotation position corresponding to the P range and the non-P target rotation position corresponding to the non-P range are properly set based on the P wall position or the non-P wall position.

Further, in the present embodiment, the motor 17 is rotated to have its rotation position matched to the P target rotation position when switching the shift range to the P range, and the motor 17 is rotated to have its rotation position matched to the non-P target rotation position when switching the shift range to the non-P range. In such manner, the shift range is switched to the P range without rotating the P wall 35 to hit the roller 31 of the detent spring 30, and the shift range is switched to the non-P range without rotating the non-P wall 36 to hit the roller 31 of the detent spring 30.

Although the present disclosure has been fully described in connection with preferred embodiment thereof with reference to the accompanying drawings, it is to be noted that various changes and modifications will become apparent to those skilled in the art.

In the above-mentioned embodiment, when the learn control for learning a reference position (i.e., when learning the P wall position or the non-P wall position), the reference position is learned as a rotation position of the motor 17 at the time of fall of the rotation speed or the angular velocity of the motor 17 down to or below the threshold value.

However, such a learning scheme may be modified to the following. That is, when an acceleration of the rotation of the motor 17 or an angular acceleration of the motor 17 falls down to or below a threshold value, e.g., is equal to or below zero, the rotation position of the motor 17 may be learned as the reference position.

Further, the present disclosure is applied to a system having the shift range switch mechanism for the switching of the shift range between the two ranges, i.e., between the P range and the non-P range, in the above embodiment, the present disclosure may also be applicable to a system that has the switch mechanism for the switching of the shift range between three or more ranges.

For example, the present disclosure may be applicable to a system that has a switch mechanism for the switching of the shift range between the four ranges, i.e., between the P range, the R range, the N range, and the D range. In such case, based on at least one of the two reference positions on the P range side and on the non-P range side (e.g., on the D range side), the target rotation positions of the four shift ranges, i.e., the P target rotation position, the R target rotation position, the N target rotation position, and the D target rotation position may be set. In the above, the P target rotation position is a target rotation position of the motor 17 at the time of switching to the P range, and the R target rotation position is a target rotation position of the motor 17 at the time of switching to the R range, and the N target rotation position is a target rotation position of the motor 17 at the time of switching to the N range, and the D target rotation position is a target rotation position of the motor 17 at the time of switching to the D range.

Thus, for the switching of the shift range to the P range, the rotation position of the motor 17 is controlled to match the P target rotation position, and, for the switching of the shift range to the R range, the rotation position of the motor 17 is controlled to match the R target rotation position, and, for the switching of the shift range to the N range, the rotation position of the motor 17 is controlled to match the N target rotation position, and, for the switching of the shift range to the D range, the rotation position of the motor 17 is controlled to match the D target rotation position.

Such changes, modifications, and summarized schemes are to be understood as being within the scope of the present disclosure as defined by appended claims.

What is claimed is:

1. A shift position switching device for shifting gears in association with a shift position, the device comprising:
   a shift mechanism configured to switch between shift positions using a drive power of a motor;
   an encoder configured to output pulse signals in sync with a rotation of the motor; and
   a controller configured to rotate the motor to a target rotation position corresponding to an intended gear, wherein;
   the controller rotates the motor toward a dead-end on a first shift position side of the shift mechanism while observing a motor rotation speed or an acceleration of rotation of the motor based on the outputted pulse signals of the encoder,
   the controller learns, as a reference position on the first shift position side, a first rotation position of the motor upon which a fall of the motor rotation speed or a fall of the acceleration of rotation of the motor down to or below a threshold value is observed, the threshold value being a non-zero value, and
   the threshold value is 80% to 90% of a maximum value of the motor rotation speed or the acceleration of rotation of the motor.

2. The shift position switching device of claim 1, wherein the controller sets a reference position on a second shift position side based on (i) a rotatable amount of the motor for the switching between a first shift position and a second shift position, and (ii) the reference position on the first shift position side.

3. The shift position switching device of claim 1, wherein when the switching from a first shift position to a second shift position is performed,
   the controller rotates the motor toward a dead-end on a second shift position side of the shift mechanism while observing the motor rotation speed or the acceleration of the rotation of the motor based on the outputted pulse signals of the encoder, and the controller learns, as a reference position on the second shift position side, a second rotation position of the motor at which the fall of the motor rotation speed or the fall of the acceleration of rotation of the motor down to or below the threshold value is observed.

4. The shift position switching device of claim 3, wherein the controller calculates a rotatable amount of the motor based on the reference position on the first shift position side and the reference position on the second shift position side.

5. The shift position switching device of claim 1, wherein the controller rotates at a preset timing the motor toward another dead-end on a second shift position side that is different from the first shift position side, for a correction of secular change influence on the shift mechanism, while observing the motor rotation speed or the acceleration of rotation of the motor based on the outputted pulse signals of the encoder, and the controller learns, as a reference position on the second shift position side, the rotation position of the motor at which the fall of the motor rotation speed or the fall of the acceleration of rotation of the motor down to or below the threshold value is observed.

6. The shift position switching device of claim 1, wherein the controller controls a rotational drive of the motor so that a per-unit-time output of the motor becomes smaller at a time of the learning of the reference position than at a time of the switching between the shift positions.

7. The shift position switching device of claim 1, wherein the controller sets the target rotation position of the motor for the switching between the shift positions based on at least one of the reference position on the first shift position side and a reference position on a second shift position side.

8. The shift position switching device of claim 7, wherein at the time of the switching between the shift positions, the controller controls the rotation of the motor so that a rotation position of the motor matches the target rotation position.

\* \* \* \* \*